(12) United States Patent
Johnson

(10) Patent No.: US 6,453,668 B1
(45) Date of Patent: Sep. 24, 2002

(54) TRANSMISSION WITH COLD START VALVE

(75) Inventor: Douglas Rene Johnson, Waterloo, IA (US)

(73) Assignee: Deere & Company, Moline, IL (US)

( * ) Notice: Subject to any disclaimer, the term of this patent is extended or adjusted under 35 U.S.C. 154(b) by 7 days.

(21) Appl. No.: 09/614,216

(22) Filed: Jul. 12, 2000

(51) Int. Cl.⁷ .............................................. F16D 31/02
(52) U.S. Cl. ......................................... 60/468; 60/494
(58) Field of Search ........................ 60/394, 399, 468, 60/494

(56) References Cited

U.S. PATENT DOCUMENTS 3,399,531 A * 9/1968 Wright ........................ 60/399

FOREIGN PATENT DOCUMENTS

| DE | 4017-004 A | * | 1/1991 | 60/468 |
| DE | 4119297 A | * | 12/1992 | 60/468 |
| FR | 2214356 | * | 8/1974 | 60/468 |
| GB | 613542 | * | 11/1948 | 60/468 |
| GB | 1445910 | * | 8/1976 | 60/468 |
| GB | 2 036 929 A | * | 7/1980 | 60/468 |
| JP | 57-103907 A | * | 6/1982 | 60/468 |
| JP | 4-254002 A | * | 9/1992 | 60/468 |
| RU | 0574554 | * | 10/1977 | 60/468 |
| RU | 848-774 | * | 7/1981 | 60/468 |
| RU | 861-119 A | * | 9/1981 | 60/468 |
| RU | 1569-440 A | * | 6/1990 | 60/468 |

* cited by examiner

*Primary Examiner*—John E. Ryznic

(57) ABSTRACT

A transmission with a mechanical cold start valve that dumps the pump output to the suction side of the pump to prevent oil pressure build up and thereby prevent pump toque loads from being applied to the engine during engine cranking. The oil eventually forces the valve closed after oil passes through a long orifice passage. The length of time for this to occur is dependent on the oil temperature and the length and diameter of the orifice passage. In colder temperatures, more time will be required for the valve to close, thus aiding in the cold starting of the engine.

1 Claim, 2 Drawing Sheets

TRANSMISSION WITH COLD START VALVE

BACKGROUND OF THE INVENTION

1. Field of the Invention

The present invention relates to a transmission having a hydrostatic unit and a charge pump and in particular to a transmission having a cold start valve that returns oil from the pump outlet to the pump inlet to avoid pump pressure buildup during cranking of an associated engine until after the engine has been started.

2. Description of Related Art

An infinitely variable hydro-mechanical transmission may be directly coupled to a driving engine without a clutch therebetween to mechanically disconnect the transmission from the engine. Such a transmission typically has an oil pump to provide charge oil to the hydrostatic unit of the transmission. The charge pump produces a torque load on the engine that must be overcome during engine starting to crank the engine. The torque load with cold oil is significantly higher than with warm or hot oil. During cold weather starting, the torque load of the charge pump can exceed the torque available for engine cranking, thus preventing the engine from starting.

SUMMARY OF THE INVENTION

The above problem during cold starting is overcome by the provision of the cold start valve in the transmission of the present invention. The cold start valve dumps the charge pump oil to the sump, i.e. to the pump inlet, for a period of time while the engine is cranked. The dumping of the charge oil eliminates or drastically reduces the pump load on the engine thereby reducing the torque required to crank the engine. The cold start valve is a mechanical valve and operates each time the tractor engine is started. The valve is temperature sensitive so that at lower temperatures, the charge pump oil is dumped for a longer period of time than at higher temperatures. There is no operator intervention required, no electronics are required and there is nothing for the operator to manually disconnect or reconnect for cold starting.

DESCRIPTION OF THE PREFERRED EMBODIMENT

Figure 1:
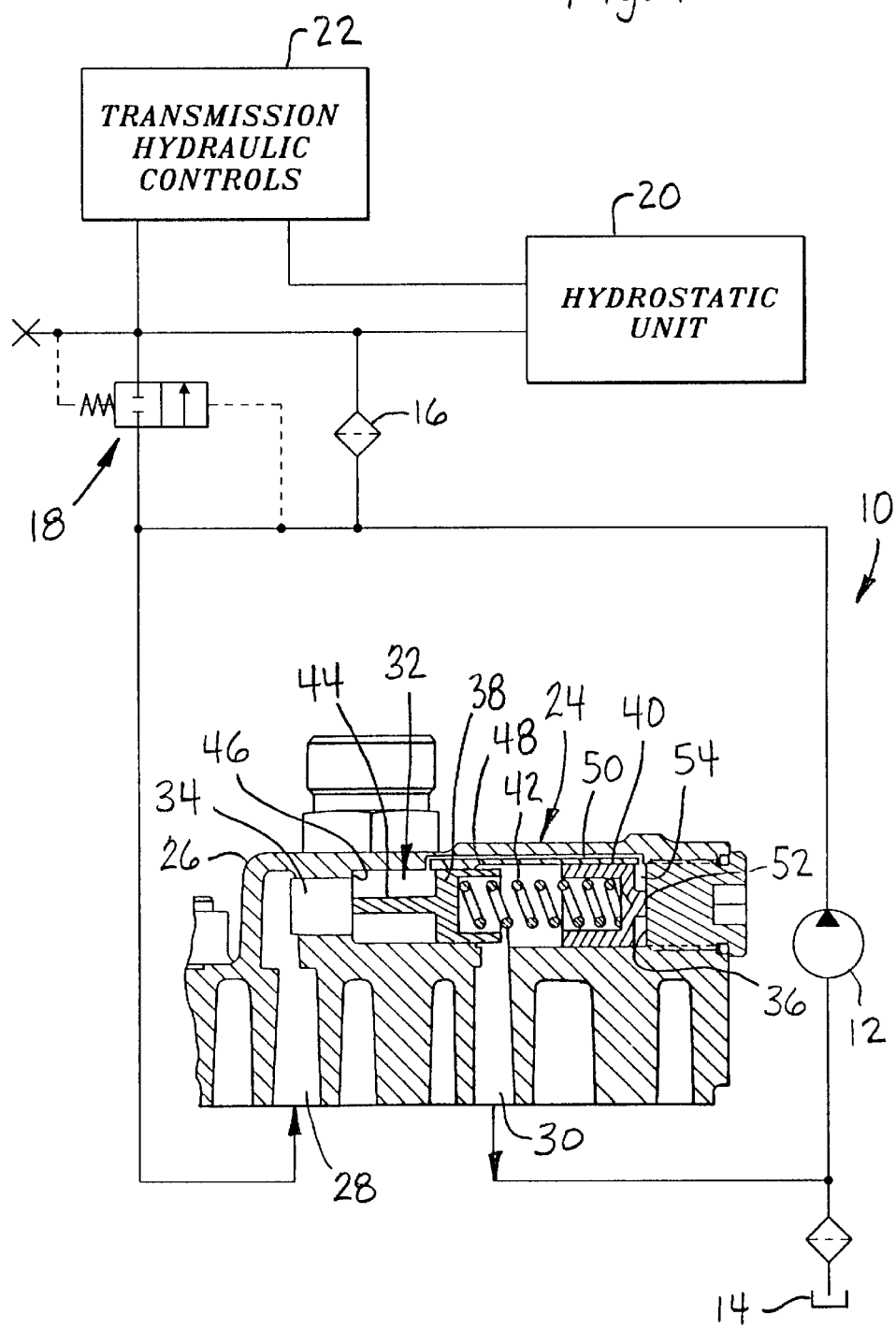
FIG. 1 is a schematic diagram of a portion of the transmission hydraulic system showing the cold start valve in section with the valve components in the position corresponding to a dead engine.

With reference to FIG. 1, a portion of the transmission hydraulic system is shown schematically and designated as 10. The hydraulic system 10 includes a charge pump 12 with a sump 14 on the input side of the pump 12. On the output side of the pump 12 are a filter 16 and a filter bypass valve 18 parallel with the filter. From the filter, oil flows to the transmission hydrostatic unit 20 and also to the transmission hydraulic controls 22. From the hydraulic controls and the hydrostatic unit, oil can be returned to the sump 14 via hydraulic lines, not shown, in a conventional manner.

A cold start valve 24 is included in the hydraulic system 10 and has a body 26. The valve body 26 has an inlet 28 that is communication with the output side of the pump 12. The valve body further has an outlet 30 that is in communication with the sump 14, i.e. the input side of the pump 12.

A valve bore 32 in the valve body 26 has an end 34 in communication with the inlet 28 for receiving oil therefrom. The outlet 30 is connected to the valve bore 32 at an intermediate position between the ends of the valve bore and spaced from the inlet 28. The valve bore 32 extends beyond the outlet 30 to a closed end 36.

Figure 2:
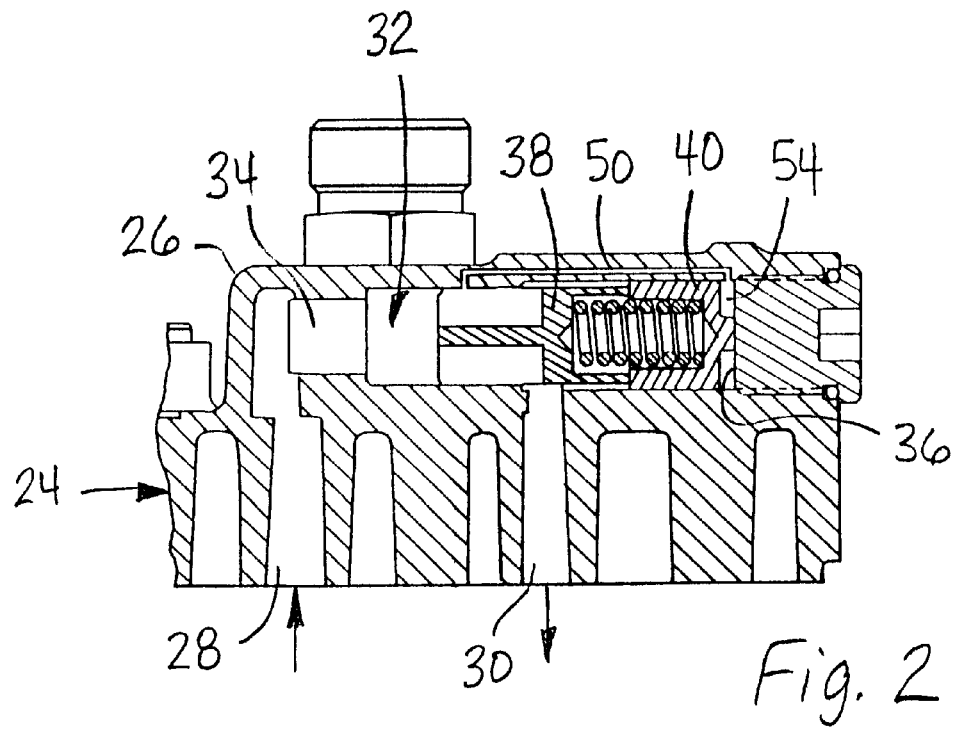
FIG. 2 is a sectional view of the cold start valve illustrating the valve components in the position corresponding to engine cranking.

Within the valve bore 32 are a valve member 38, a piston 40 and a spring 42 therebetween. The valve member 38 is moveable between a closed position shown in FIG. 1 and an open position shown in FIG. 2. In the closed position, the valve member 38 is positioned between the inlet 28 and the outlet 30, blocking the flow of oil through the valve body 26. The valve member 38 is biased to the closed position by the spring 42. In the closed position, a stem 44 of the valve member is seated against a stop 46 in the valve bore.

The wall of the valve bore has a step 48 so that the piston 40 has a larger diameter than the valve member 38 does. The piston 40 has a short stem 52 that engages the closed end 36 of the valve bore 32 to leave a small gap 54 between the piston and the closed end of the valve bore. The valve body 26 further has an orifice passage 50 that spans over the valve member 38 and piston 40 when each are biased away from one another and against the stops in the valve bore as shown in FIG. 1.

The operation of the valve will now be described. When the engine is not operating, there is no oil pressure in the valve body. The spring 48 biases the valve member 38 and piston 40 away from one another to the positions shown in FIG. 1. When the engine is cranked, the pump 12 is turned, generating oil pressure in the system 10. When the oil pressure overcomes the force of the spring 42, the valve member 38 will move to the right to the open position shown in FIG. 2. in which oil can flow from the valve body inlet 28 to the outlet 30 and back to the sump 14. The maximum oil pressure that can be produced by the pump 12 is determined by the force of the spring 42.

Figure 3:
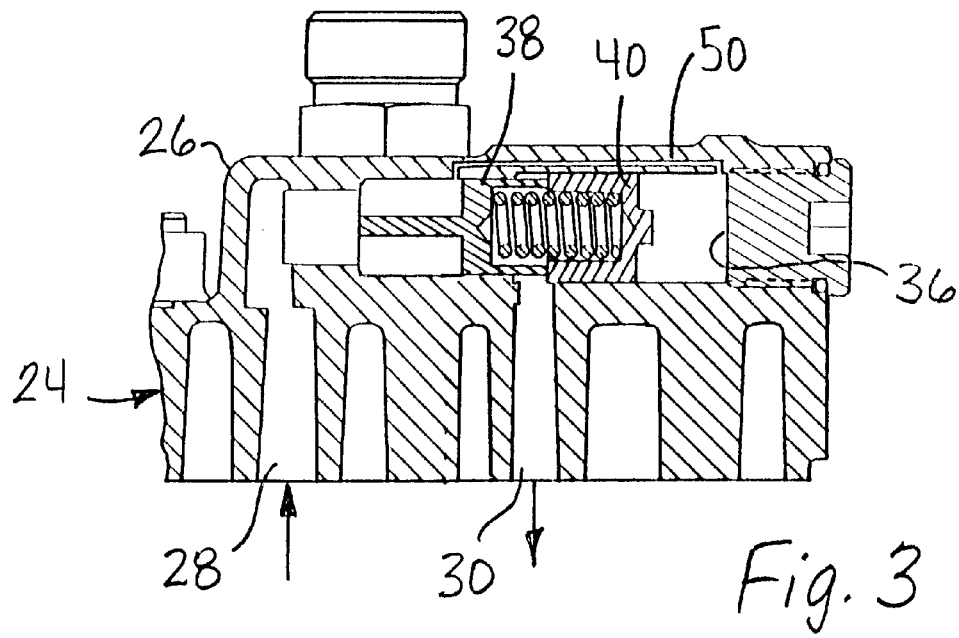
FIG. 3 is a sectional view of the cold start valve illustrating the valve components in the position corresponding to normal engine operation with warm transmission oil.

As the engine is cranked and as it starts, the pressure at the pump inlet also forces oil through the orifice passage 50 to the closed end of the valve body. Since the piston has a larger diameter than the valve member 38 does, the piston will eventually force the valve member back to the closed position as shown in FIG. 3. This occurs when the oil pressure force acting on the piston exceeds the oil pressure force on the valve member. The time required for the piston to move the valve member and stop the flow of oil through the cold start valve 24 is a function of the oil temperature and the diameter and length of the orifice passage 50. The lower the oil temperature, the greater the time required for the oil to flow through the orifice passage 50 and reach the piston 40.

The cold start valve allows the dumping of the charge pump pressure in cold weather to reduce the torque load on the engine and allow for easier cranking and therefore easier engine starting. The valve operates each time the tractor is started and is temperature sensitive so that at lower temperatures, the charge pump oil is dumped for a longer period of time. No operator intervention is required. The valve is purely mechanical and requires no electrical actuation. There is nothing for the operator to manually disconnect or reconnect to accomplish the cold starting procedure.

The invention should not be limited to the above-described embodiment, but should be limited solely by the claims that follow.

I claim:
1. A transmission adapted to be driven by an engine, the transmission comprising:
   an oil pump;
   a hydrostatic unit;
   a hydraulic circuit for directing the flow of oil to and from the pump;
   a cold start valve within the hydraulic circuit operable to open when the engine is started to return oil from the pump outlet to the pump inlet for a short period of time whereby the pump load on the engine is reduced during starting, the cold start valve having:
      a valve body with a valve bore therein;
      an inlet and an outlet connected to the valve bore with the inlet communicating with one end of the bore and the outlet at an intermediate portion of the bore and the bore extending to a closed end beyond the outlet, the valve body inlet being in communication with the output side of the pump and the valve body outlet being in communication with the input side of the pump;
      a valve member movable in the bore between a closed position and an open position in which in the open position the inlet and outlet are in communication with one another through the bore and in the closed position the valve member separates the inlet from the outlet,
   the cold start valve further having a piston at the closed end of the bore and a spring disposed between the piston and the valve member to urge the valve member to the closed position whereby the valve member remains in the closed position unless oil pressure at the inlet overcomes the spring force;
   the closed end of the valve bore and the piston having a larger diameter than the valve member; and
   the valve body having an orifice passage from the inlet to the closed end of the bore whereby when the pressure in the closed end of the bore equals the pressure at the inlet, the piston will move toward the inlet and move the valve member to the closed position.

* * * * *